May 12, 1953 — L. O. HECK — 2,638,272
INDICATOR

Filed Sept. 20, 1951 — 2 Sheets-Sheet 1

Inventor
LEWIS OWENS HECK
By
Bailey, Stephens & Huettig
Attorneys

May 12, 1953 L. O. HECK 2,638,272
INDICATOR
Filed Sept. 20, 1951 2 Sheets-Sheet 2
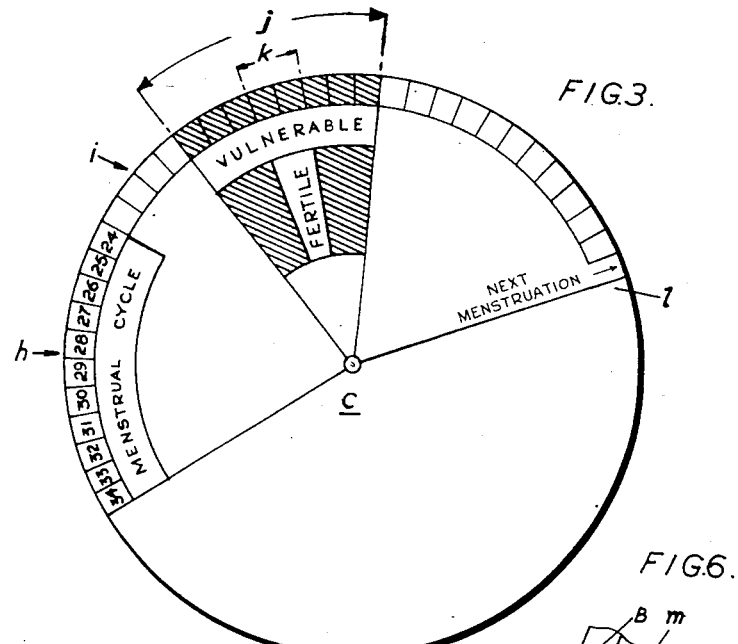
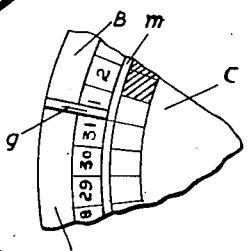
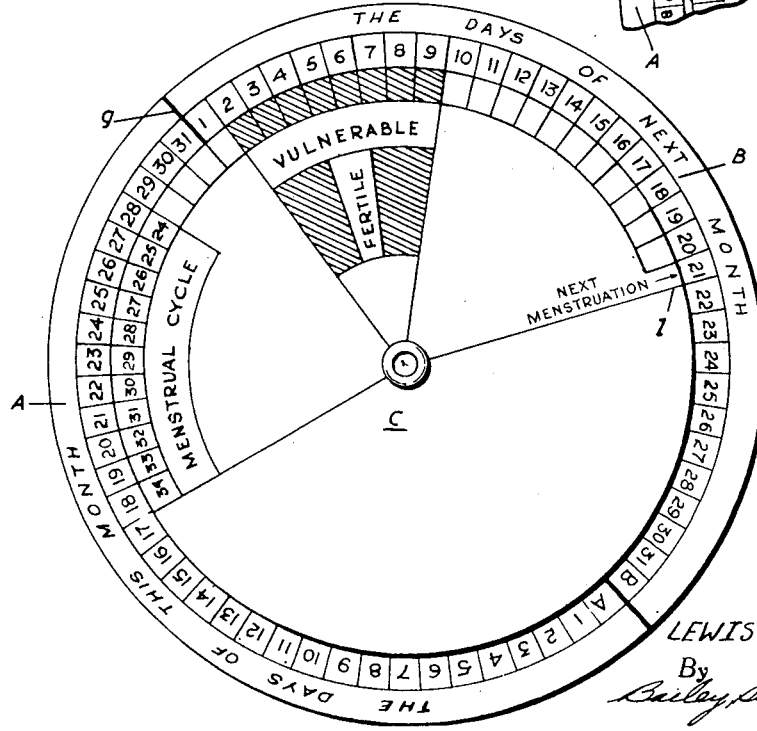
Inventor
LEWIS OWENS HECK
By
Bailey, Stephens + Huettig
Attorneys Patented May 12, 1953

2,638,272

UNITED STATES PATENT OFFICE 2,638,272

INDICATOR

Lewis Owens Heck, London, England

Application September 20, 1951, Serial No. 247,387
In Great Britain October 13, 1950

2 Claims. (Cl. 235—88)

The invention consists in an instrument for indicating which days during the month a woman can become pregnant and the probable date of succeeding menstrual period.

A menstrual and fertility indicating instrument according to the invention comprises three superposed dials mounted on a central pivot for independent rotation, the first and second dials have circumferential graduations representing days of the current month and the succeeding month respectively, and the third or uppermost dial having circumferential graduations representing menstrual cycle, vulnerable and fertility periods, and also having an arrow or pointer, the second dial being cut away or slotted circumferentially so as to expose the graduations of the first dial when rotated over it and having a radial edge forming a cursor to enable it to be set selectively on the first dial with the graduation denoting the first day of the succeeding month immediately following the last day of the current month, so that when the third dial is rotated to bring the graduation thereon denoting the known menstrual period opposite to the date on the first dial on which menstruation occurred in the present month, the graduations on the third dial corresponding to vulnerable and fertility periods will be brought opposite to the corresponding days of the succeeding month on the second dial, and the arrow or pointer on the third dial will be brought opposite to the graduation on the second dial denoting the succeeding date of menstruation.

In the accompanying drawings:

Figures 1 to 3 are plans of three dials as seen separated;

Figure 4 is a plan of the complete indicating instrument;

Figures 5 and 6 are respectively, a side sectional view and a plan illustrating a modification.

Figure 1:
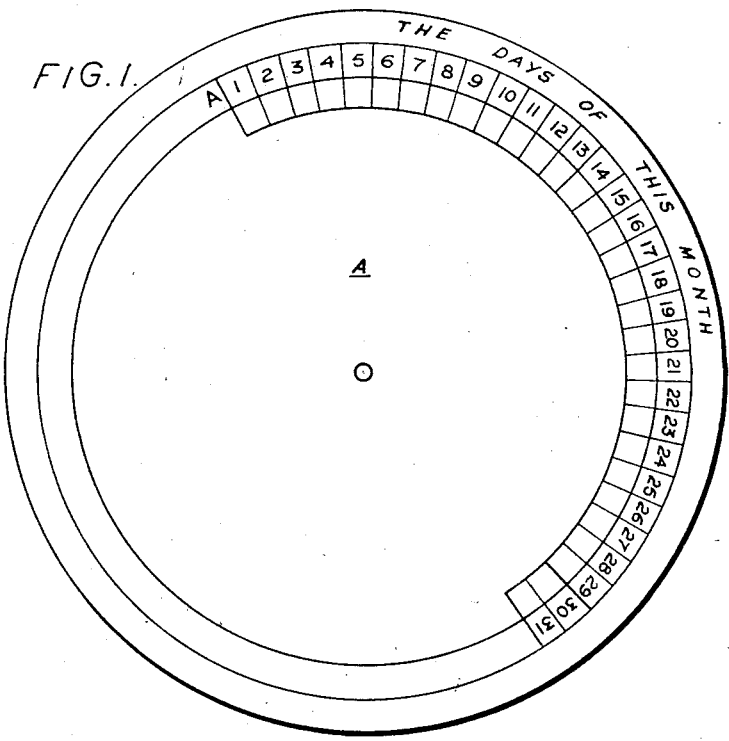
Figure 2:
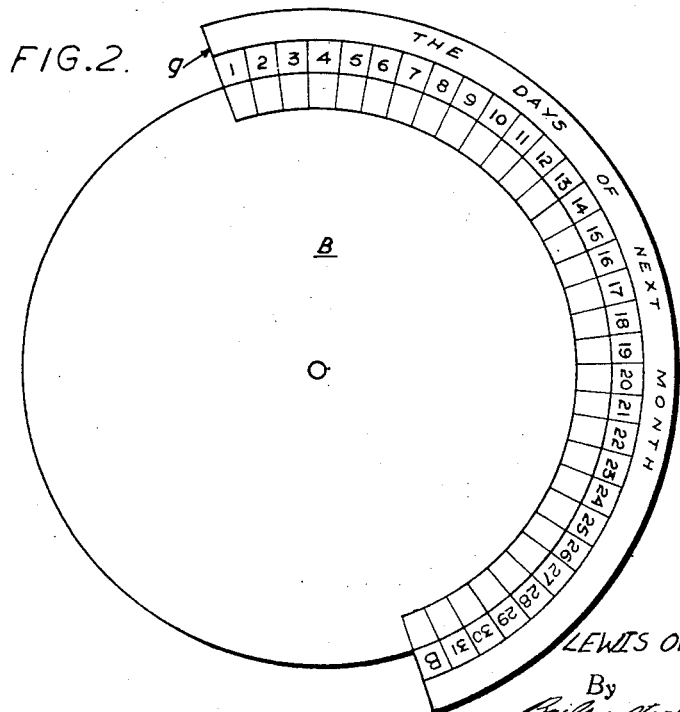

In the example shown in Figures 1 to 4 the indicating instrument comprises three dials A, B and C superposed and connected at the centres by an eyelet $f$ forming a central pivot about which the dials can be rotated independently.

The dials are composed of suitably stiff material such as Celluloid, ebonite, plastic or even stout paper.

The first or lowermost dial A is provided around half of its circumferential margin with equal radial divisions or graduations bearing numerals 1 to 31 inclusive representing days of the current month.

The second dial B is similarly provided around half of its circumferential margin with equal radial divisions or graduations bearing numerals 1 to 31, inclusive representing days of the succeeding month.

The remaining half of the circumferential margin of the dial B is cut away for a depth at least equal to the depth of the marginal graduations of the dial A and so that the forward radial edge $g$ will act as a cursor.

The graduations on the dials A and B are arranged to be read in a clockwise direction.

The third or uppermost dial C is provided with circumferential or marginal graduations corresponding in dimension with those on the other dials.

The first group $h$ of graduations on the dial C bear numerals 24 to 34 inclusive reading in an anticlockwise direction. These numerals refer to the menstrual cycle.

The next group $i$ is left blank.

The following eight graduations $j$ are distinguished by hatch lines or otherwise, for instance, they may be coloured.

The whole group $j$ represents a vulnerable period, whereas the central two graduations $k$ of the group $j$ represent a fertile period.

A pointer or arrow $l$ is provided on the uppermost dial C for indicating on the dial B the date of the next menstruation.

By way of example let it be assumed that there are thirty-one days in the current month and that the regular menstrual cycle of the user is twenty-eight days, and the date of menstruation in the current month is the twenty-fourth.

The dial B is rotated to bring the cursor $g$ against the graduation 31 on the dial A as shown in Figure 4.

The dial C is then rotated to bring the graduation 28 of the group $h$ opposite to the graduation 24 on the dial A.

The group $j$ of graduations will then indicate on the dial B the vulnerable period whereas the group $k$ will indicate the most likely period of fertility. The arrow or pointer $l$ will indicate on the dial B the date when the next menstruation may be expected.

In the example shown in Figures 5 and 6 the dial C is shown provided with a bevelled circumferential edge $m$ bearing the graduations, and the dial B with a bevelled edge $g$ forming the cursor.

I claim:

1. A menstrual and fertility indicating instrument comprising three superposed dials mounted on a central pivot for independent rotation, the first and second dials having circumferential graduations representing days of the current month and the succeeding month respectively, and the third uppermost dial having circumferential graduations representing menstrual cycle, vulnerable and fertility periods, and also having an arrow pointer, the second dial being cut away partially circumferentially so as to expose the graduations of the first dial when rotated over it and having a radial edge forming a cursor to enable it to be set selectively on the first dial with the graduation denoting the first day of the succeeding month immediately following the last day of the current month, so that when the third dial is rotated to bring the graduation thereon denoting the known menstrual period opposite to the date on the first dial on which menstruation occurred in the present month, the graduation on the third dial corresponding to vulnerable and fertility periods is positioned opposite to the corresponding days of the succeeding month on the first or second dial, and the arrow or pointer on the third dial is positioned opposite to the graduation on the first or second dial denoting the succeeding date of menstruation.

2. A menstrual and fertility indicating instrument as in claim 1, further comprising said vulnerable and fertility period being delineated upon said third dial intermediate said menstrual cycle graduations and said arrow pointer.

LEWIS OWENS HECK.

References Cited in the file of this patent

UNITED STATES PATENTS

| Number | Name | Date |
| --- | --- | --- |
| 2,118,354 | Mansur | May 24, 1938 |